United States Patent
Fujino et al.

(10) Patent No.: US 7,369,160 B2
(45) Date of Patent: May 6, 2008

(54) CAMERA SYSTEM FOR TRANSFERRING BOTH IMAGE DATA AND AN IMAGE PROCESSING PROGRAM TO TRANSFER THE IMAGE DATA TO AN EXTERNAL DEVICE

(75) Inventors: Kenji Fujino, Musashino (JP); Tooru Katsurai, Musashino (JP); Shuuji Yamamoto, Musashino (JP); Hisanori Hayashi, Musashino (JP); Ryoutatsu Iga, Musashino (JP); Gentarou Fukano, Musashino (JP); Harumi Wada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 724 days.

(21) Appl. No.: 10/170,500

(22) Filed: Jun. 14, 2002

(65) Prior Publication Data
US 2002/0191082 A1  Dec. 19, 2002

(30) Foreign Application Priority Data

| Jun. 15, 2001 | (JP) | ............................. 2001-181511 |
| Sep. 12, 2001 | (JP) | ............................. 2001-276211 |
| Sep. 14, 2001 | (JP) | ............................. 2001-279474 |
| Apr. 25, 2002 | (JP) | ............................. 2002-124096 |

(51) Int. Cl.
*H04N 5/232* (2006.01)
(52) U.S. Cl. ............................. 348/211.3; 348/211.99; 348/211.1; 348/211.4; 348/211.5
(58) Field of Classification Search ............ 348/211.3, 348/211.4, 143, 152–155
See application file for complete search history.

(56) References Cited

U.S. PATENT DOCUMENTS 6,323,858 B1 * 11/2001 Gilbert et al. .............. 345/419
6,654,060 B1 * 11/2003 Kurosawa et al. ..... 348/333.02

(Continued)

FOREIGN PATENT DOCUMENTS

JP           10-51674           2/1998

(Continued)

OTHER PUBLICATIONS

Relevant URLs: http://www.mathtools.net/Java/Image_Processing/index.html; http://rsb.info.nih.gov/ij/ip-demo1/; http://rsb.info.nih.gov/ij/ip-demo2/.*

(Continued)

*Primary Examiner*—Lin Ye
*Assistant Examiner*—Anthony J Daniels
(74) *Attorney, Agent, or Firm*—Westerman, Hattori, Daniels & Adrian, LLP.

(57) ABSTRACT

An object of the present invention is to realize a camera system suitable for remote monitoring. The present invention is made by making improvements to a camera system that transmits camera image data to a network. The camera system includes a camera head including an image sensor and a sensor controller that controls the image sensor; a video signal processing means that performs video signal processing on image data from the image sensor; and a web server which transmits image data from the video signal processing means as the camera image data to the network, receives control data from the network, and controls at least the sensor controller or the video signal processing means.

5 Claims, 14 Drawing Sheets

U.S. PATENT DOCUMENTS

2003/0069809 A1 * 4/2003 von Rosen et al. .......... 705/26

FOREIGN PATENT DOCUMENTS

| JP | 10-124418 | 5/1998 |
|---|---|---|
| JP | 10-243380 | 9/1998 |
| JP | 11-110311 | 4/1999 |
| JP | 11-191858 | 7/1999 |
| JP | 2000-101994 | 4/2000 |
| JP | 2000-134522 | 5/2000 |
| JP | 2001-142599 A | 5/2001 |
| JP | 2001-218192 | 8/2001 |
| JP | 2001-222318 | 8/2001 |
| JP | 3371418 | 11/2002 |
| JP | 2003-99629 A | 4/2003 |

OTHER PUBLICATIONS

Steven Decker, et al., "A 256×256 CMOS Imaging Array with Wide Dynamic Range Pixels and Column-Parallel Digital Output," IEEE Journal of Solid-State Circuits vol. 33, No. 12, pp. 2081-2091, Dec. 1998.

* cited by examiner

Barrier voltage waveform

Input-output characteristics

Barrier voltage waveform

Input-output characteristics

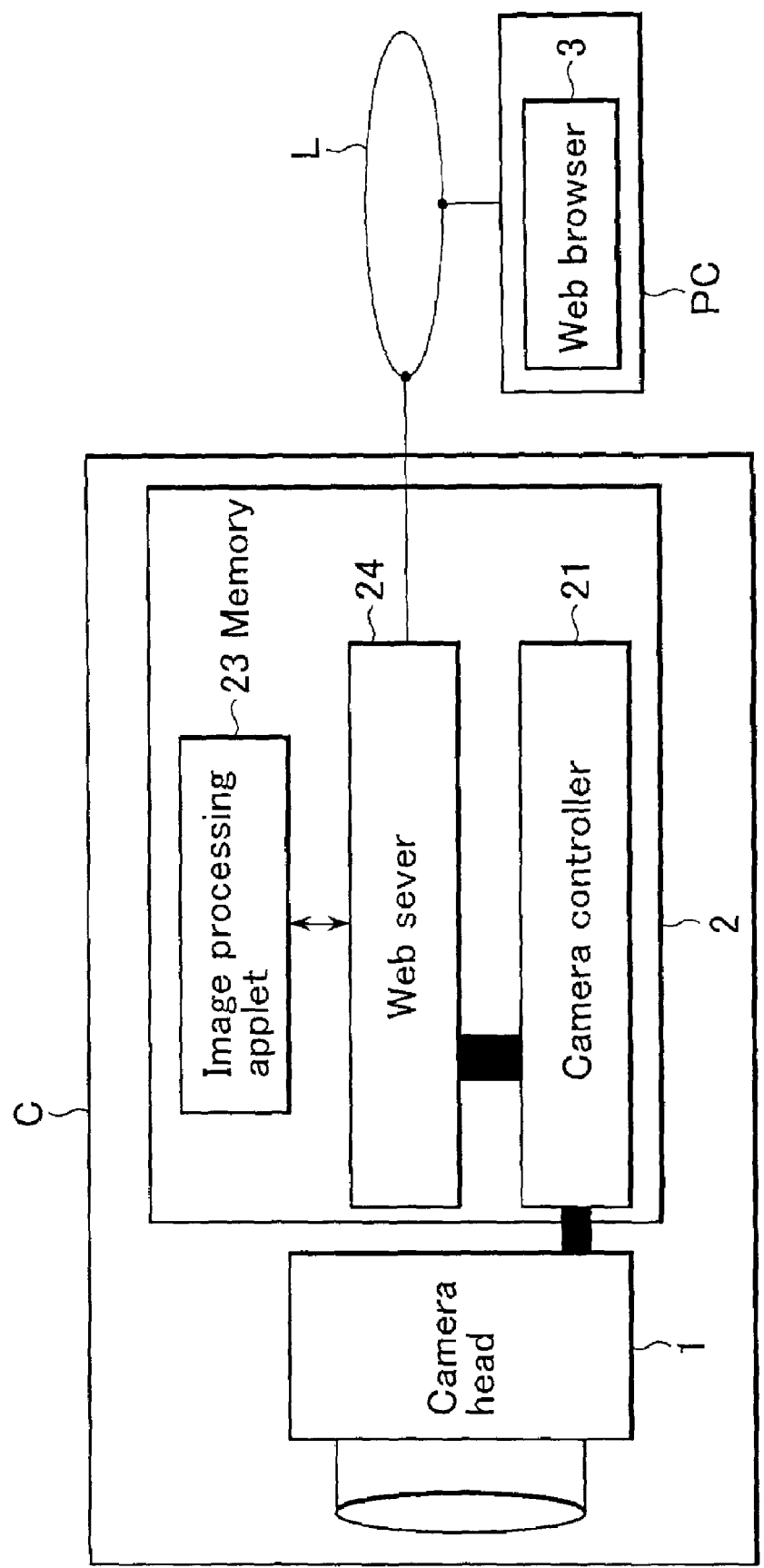

CAMERA SYSTEM FOR TRANSFERRING BOTH IMAGE DATA AND AN IMAGE PROCESSING PROGRAM TO TRANSFER THE IMAGE DATA TO AN EXTERNAL DEVICE

BACKGROUND OF THE INVENTION

1. Field of the Invention

The present invention pertains to a camera system for transmitting camera image data to a network, and pertains to a camera system suitable for remote monitoring.

2. Description of the Prior Art

Heretofore, video cameras have been connected to web servers, and web browsers have been used over a network (e.g., the Internet, intranet, extranet) to remotely control mechanical video camera operations, such as panning, tilting, zooming and focusing, and the cameras' irises and shutter speed, in order to enjoy video taken by the cameras. Such systems are described in, for example, the publication of Patent Application 1998-51674.

In order to enjoy remote video with such systems, the mechanical parts are controlled through a network. In such cases, the camera image has normally been a daytime image, and it has been sufficient for the image quality to be uniform as long as it could be simply viewed.

However, with outdoor cameras and the like which are used for remote monitoring, because they are used for monitoring, proper viewing ability is required at all times even if there are environmental changes, such as dramatic changes in brightness and luminance between daytime and nighttime. In addition, on a given image, it must be possible to properly view even bright areas and dark areas. Such cases have been problematic in that proper viewing in accordance with environmental changes and conditions has not been possible.

In addition, because panning, tilting, zooming, and the like require the control of mechanical parts, maintenance is necessary, which has been a factor in increasing costs for remote monitoring.

In addition, with cameras and the like which are used for remote monitoring, because they are used for monitoring, in many cases it is desirable to process camera images in order to extract features of the monitored subject. Accordingly, the placement of an image processing unit on the Web server end has been considered.

An advantage of Web servers is that multiple people can view an image through multiple computers. Monitoring, however, requires real-time capability. More specifically, if an image processing unit is placed on the Web server end, then requests from multiple computers cannot be processed in real time. In addition, if complex image processing is performed so as to satisfy the requests of all computers, then the load on the Web server will be excessive and monitoring will be impeded. In addition, because the Web server is controlled through computers, the image processing results for a request from one computer end up being sent to other computers as well, which has been a problem.

SUMMARY OF THE INVENTION

An object of the present invention is to realize a camera system suitable for remote monitoring.

BRIEF DESCRIPTION OF THE DRAWINGS

FIG. 15 is a block diagram that illustrates a fourth embodiment of the present invention.

DETAILED DESCRIPTION OF THE PREFERRED EMBODIMENTS

Embodiments of the present invention are described below with reference to the accompanying drawings.

First Embodiment

Figure 1:
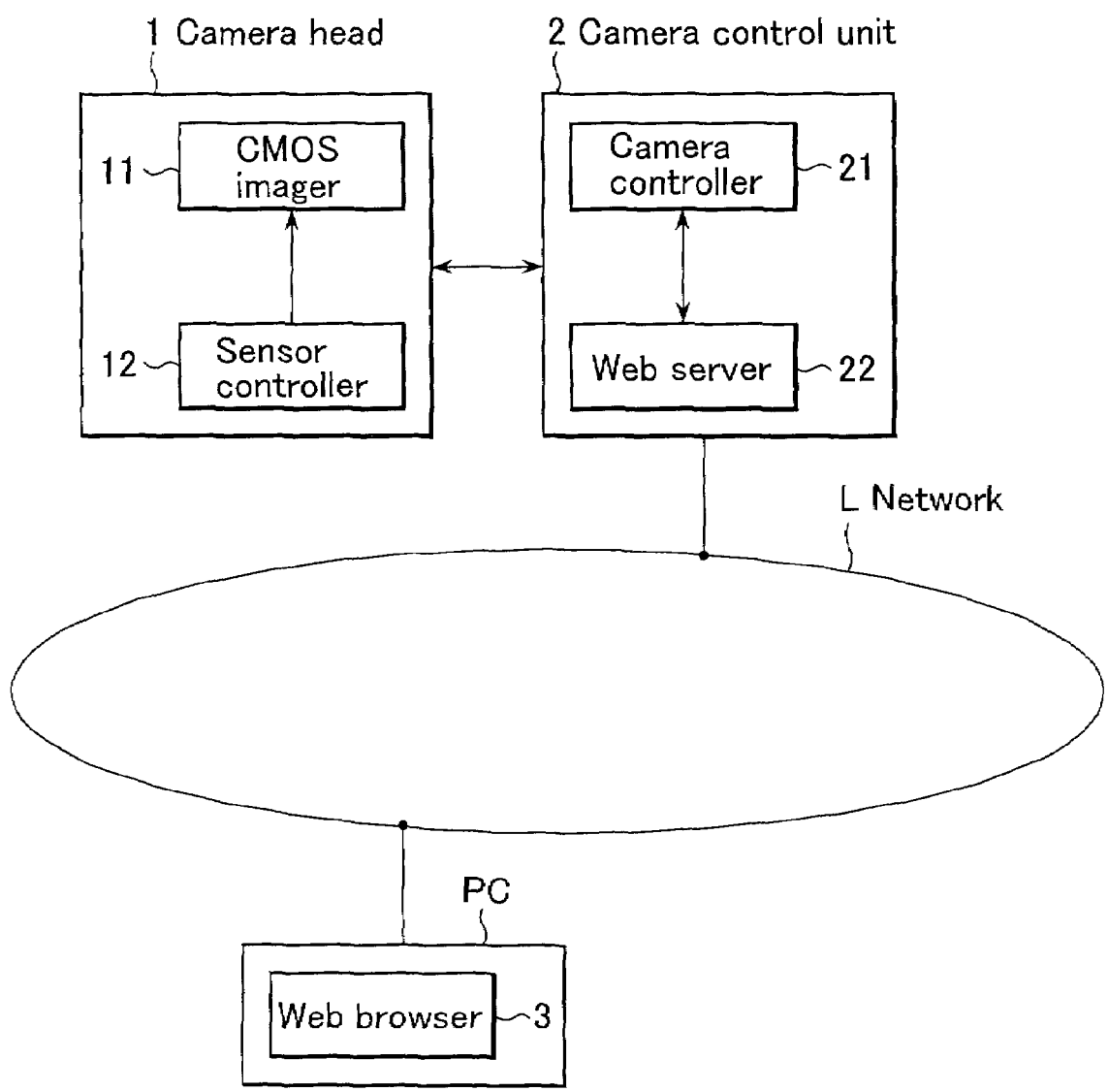
FIG. 1 is a block diagram that illustrates a first embodiment of the present invention.

FIG. 1 is a block diagram of the first embodiment of the present invention.

In FIG. 1, a camera head 1 is comprised of a CMOS (Complementary Metal-Oxide Semiconductor) imager 11 and sensor controller 12. The CMOS imager 11 is an image sensor capable of picking up color images. It creates RGB (red green blue) data (image data) with a variable dynamic range. This type of CMOS imager 11 is described in, for example, IEEE JOURNAL OF SOLID-STATE CIRCUITS, VOL.33, NO.12, DECEMBER 1998, "A 256×256 CMOS Imaging Array with Wide Dynamic Range Pixels and Column-Parallel Digital Output", Steven Decker, R. Daniel McGrath, Kevin Brehmer, and Charles G. Sodini. The sensor controller 12 controls the CMOS imager 11.

A camera control unit 2 is connected to a network L, and connected to the camera head 1 through, for example, LVDS (Low Voltage Differential Signaling). It comprises a camera controller 21 and web server 22. In addition, the camera control unit 2 may comprise an NTSC (National TV Standards Committee) interface, IEEE1394 interface, and the like, and may comprise a structure for generating horizontal and vertical synchronization signals, field signals, and pixel clock signals from the RGB data, and outputting images through each interface.

The network L includes Ethernet (registered trademark), which is capable of TCP/IP (Transmission Control Protocol/Internet Protocol) communication; ISDN (Integrated Services Digital Network) networks; xDSL (x Digital Subscriber Line) networks; PHS (Personal Handyphone System) networks; CATV (Cable Television) networks; wireless (Bluetooth (trademark)); and the like.

The camera controller 21 comprises video signal processing means. It controls the camera head 1 and performs color processes on the RGB data generated by the CMOS imager 11, such as color interpolation, color adjustment, color matrix adjustment, white balance adjustment, gamma correction, knee correction, black level adjustment, and color saturation adjustment. It then converts the data to 16-bit YCrCb (brightness and hue) images.

The web server 22 comprises image compression means. It is connected to the camera controller 21 through, for example, a control serial bus and image data parallel bus. The web server 22 uses the image compression means to perform image compression on the YCrCb data, such as JPEG (Joint Photographic Coding Experts Group) compression or MPEG (Moving Picture Coding Experts Group) compression. In addition, the web server 22 uses HTTP (HyperText Transfer Protocol) communication to transmit to (publish on) the network L the camera image data after JPEG compression, MPEG compression, or the like; and to receive control data from the network L for controlling the camera controller 21 and sensor controller 12.

A computer PC is monitoring means which comprises input means such as a keyboard and mouse, as well as display means such as a CRT, and the like. It is connected to the network L and comprises a web browser 3. The web browser 3 uses HTTP communication to receive camera image data from the web server 22 and to send control data to the web server 22 through the network L.

Figure 2A:
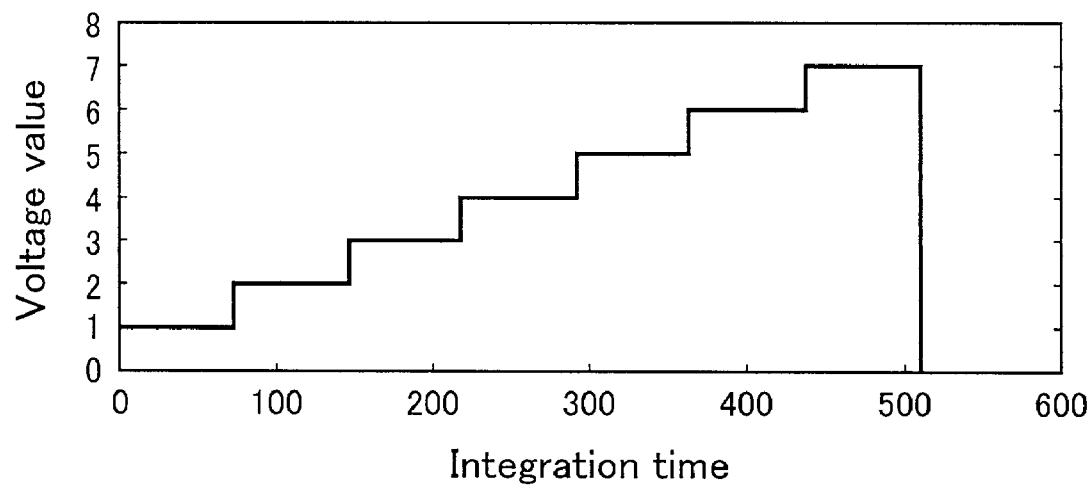
FIG. 2 is a graph that explains the operations of the CMOS imager 11.
Figure 2B:
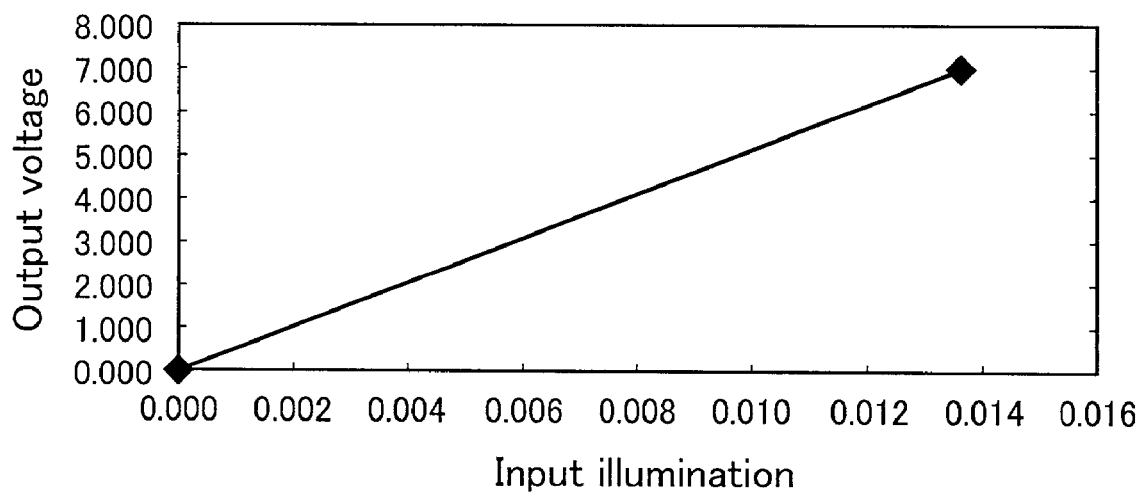
Figure 3A:
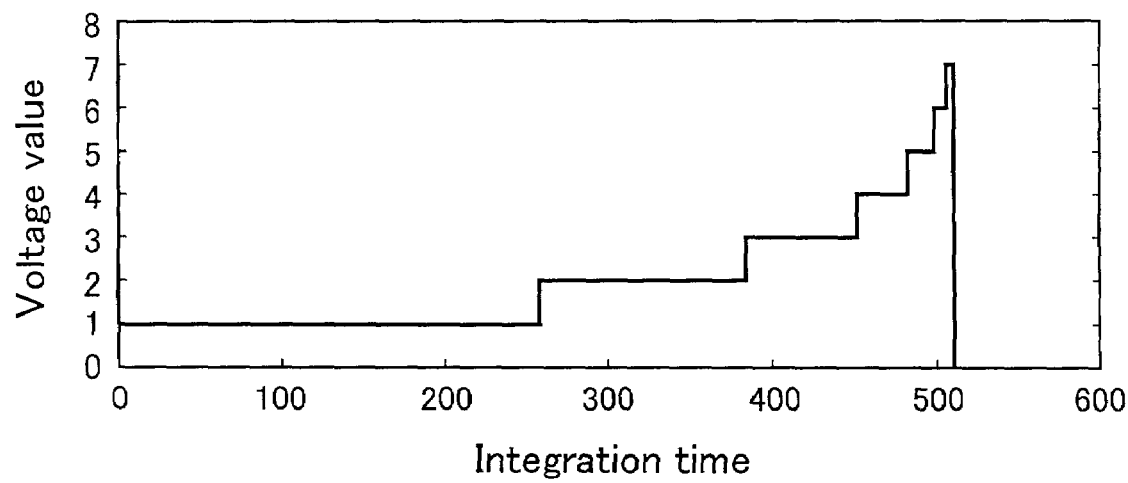
FIG. 3 is a graph that explains the operations of the CMOS imager 11.
Figure 3B:
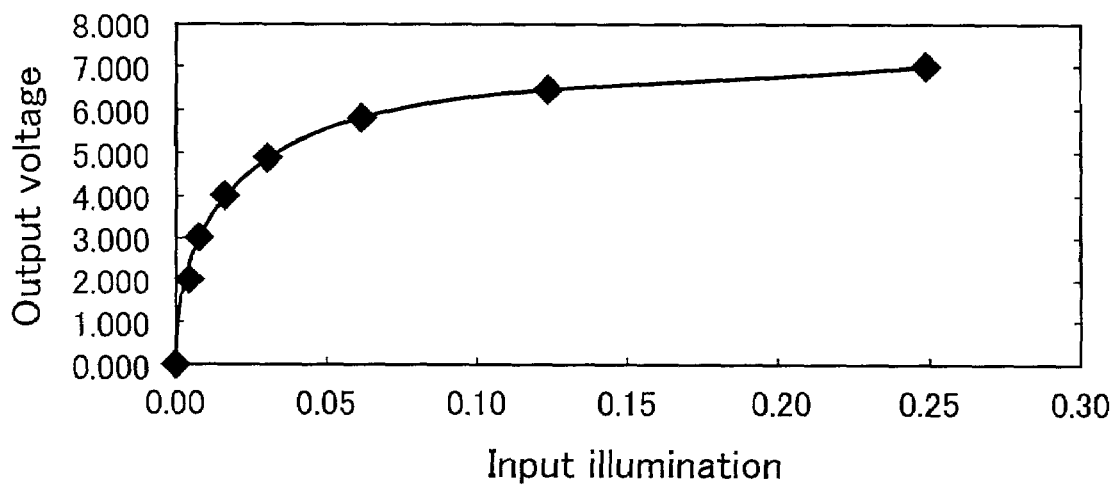

The operations of such a system are described below. FIGS. 2 and 3 are graphs that explain the operations of the CMOS imager 11. FIGS. 2(a) and 3(a) are graphs that illustrate the relationship between the integration time, which controls the in-pixel amplifier circuits, and the barrier voltage waveform. Integration time is shown on the horizontal axis and voltage values on the vertical axis. FIGS. 2(b) and 3(b) are graphs that illustrate the input-output characteristics corresponding to the waveforms shown in FIGS. 2(a) and 3(a). Input illumination is shown on the horizontal axis and output voltage (brightness) on the vertical axis. It should be noted that 1.25 V is indicated as a voltage value of "7", and one second is indicated as an integration time of "512". The unit for input illumination is $\times 10^3$ lx.

The input means of the computer PC inputs control data and integration time "511" to the web browser 3, which the web browser 3 transmits to the web server 22 through the network L by means of HTTP communication.

The web server 22 delivers integration time "511" to the sensor controller 12 through the camera controller 21. Following this integration time, the sensor controller 12 inputs the barrier voltage (shown in FIG. 2A) to the CMOS imager 11. As a result, the CMOS imager 11 outputs an output voltage (brightness) with the characteristics shown in FIG. 2B relative to the input illumination. In this case, the input illumination value is small ("0.014") and the output brightness (light areas) is saturated.

Next, the CMOS imager 11 outputs the RGB data to the camera controller 21, with the frame rate, which is variable between 1 and 60 fps (frames per second), set to 14 fps. The camera controller 21 converts the RGB data to YCrCb image data. The web server 22 compresses and converts this YCrCb image data to JPEG image data and sends it through the network L to the web browser 3 by means of HTTP communication.

Figure 4:
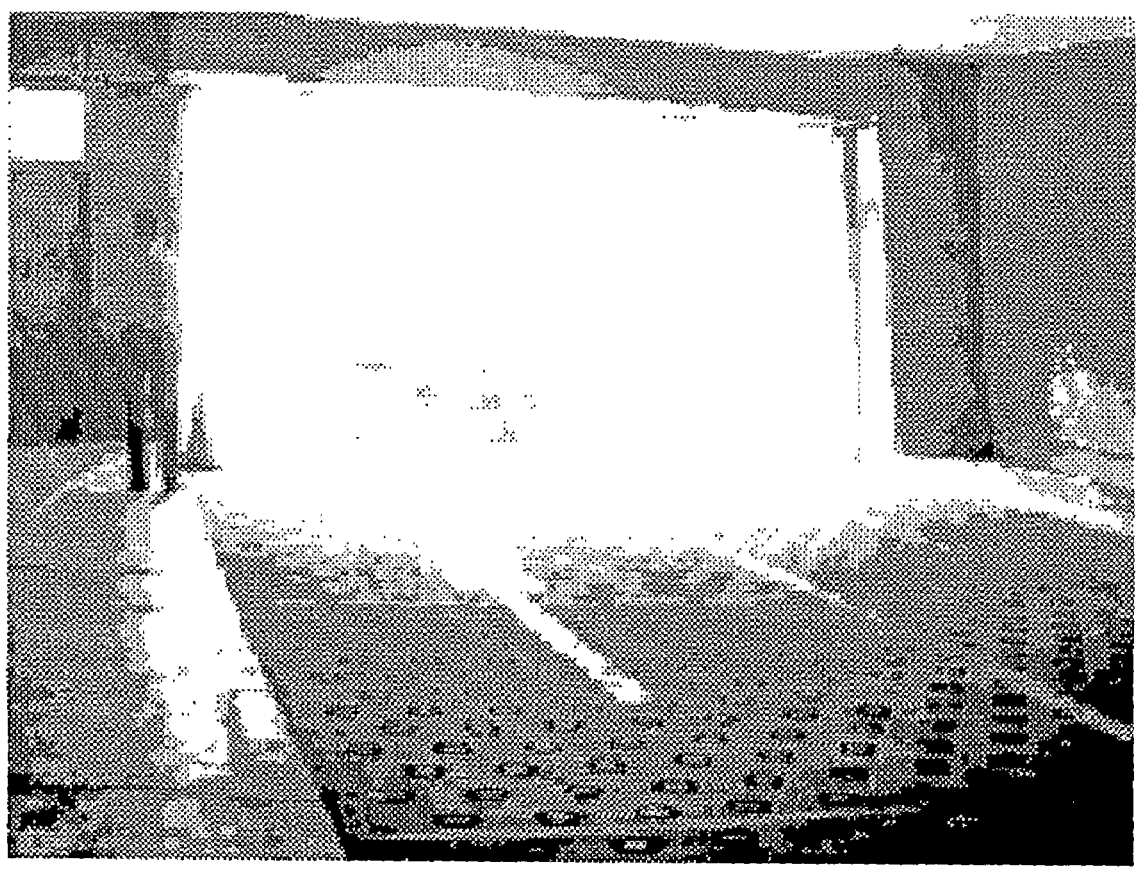
FIG. 4 is a diagram that illustrates a display example for the web browser 3.

The web browser 3 displays the JPEG image data as shown in FIG. 4. The result is that, because the integration time is long, the image is displayed with the dark areas optimized and the light areas saturated. Therefore, the input means of the computer PC is used to input control data and integration time "25" to the web browser 3. The web browser 3 then transmits this through the network L to the web server 22 by means of HTTP communication.

The web server 22 delivers integration time "25" to the controller 12 through the camera controller 21. Following this integration time, the sensor controller 12 shortens the barrier voltage waveform shown in FIG. 2A from integration time "511" to "25" and inputs this to the CMOS imager 11. Accordingly, the waveform shape is the same as in FIG. 2B, but the input illumination value is increased, resulting in an image with optimized light areas and blotted dark areas.

Next, the CMOS imager 11 outputs the RGB data to the camera controller 21, with the frame rate set to, for example, 14 fps. The camera controller 21 converts the RGB data to YCrCb image data. The web server 22 compresses and converts this YCrCb image data to JPEG image data and sends it through the network L to the web browser 3 by means of HTTP communication.

Figure 5:
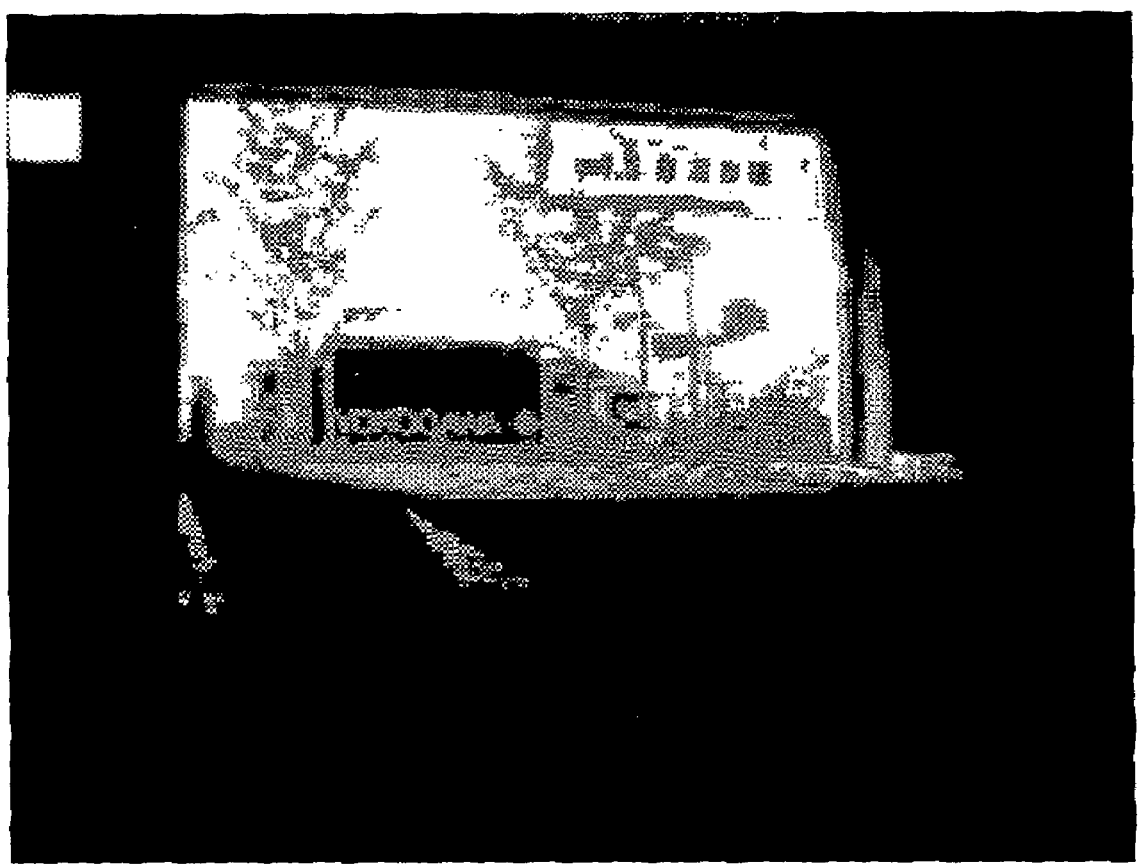
FIG. 5 is a diagram that illustrates a display example for the web browser 3.

The web browser 3 displays the JPEG image data as shown in FIG. 5. The result is that, if the photographed subject is the same as in FIG. 4, because the integration time is short, the image is displayed with the light areas optimized and the dark areas blotted. Therefore, it is possible to optimally describe both the light and dark areas if the output brightness change is large for areas where input illumination is small, and if the output brightness change is small for areas where input illumination is large. More specifically, the dynamic range is changed from linear to a logarithmic compressed curve as shown in FIG. 3(b). Thus the brightness compression is optimized for input illumination to optimally describe the light and dark areas.

Therefore, the input means of the computer PC is used to input, to the web browser 3, control data and integration time "511", and to change the setting from linear to logarithmic compressed curve, such as selecting the optimal dynamic range from 28 different settings. The web browser 3 transmits the control data through the network L to the web server 22 by means of HTTP communication.

The web server 22 delivers integration time "511" and dynamic range to the sensor controller 12 through the camera controller 21. The sensor controller 12 inputs the barrier voltage waveform shown in FIG. 3(a) to the CMOS imager 11. As a result, the CMOS imager 11 outputs an output voltage (brightness) with the characteristics shown in FIG. 3(b) relative to the input illumination.

Figure 6:
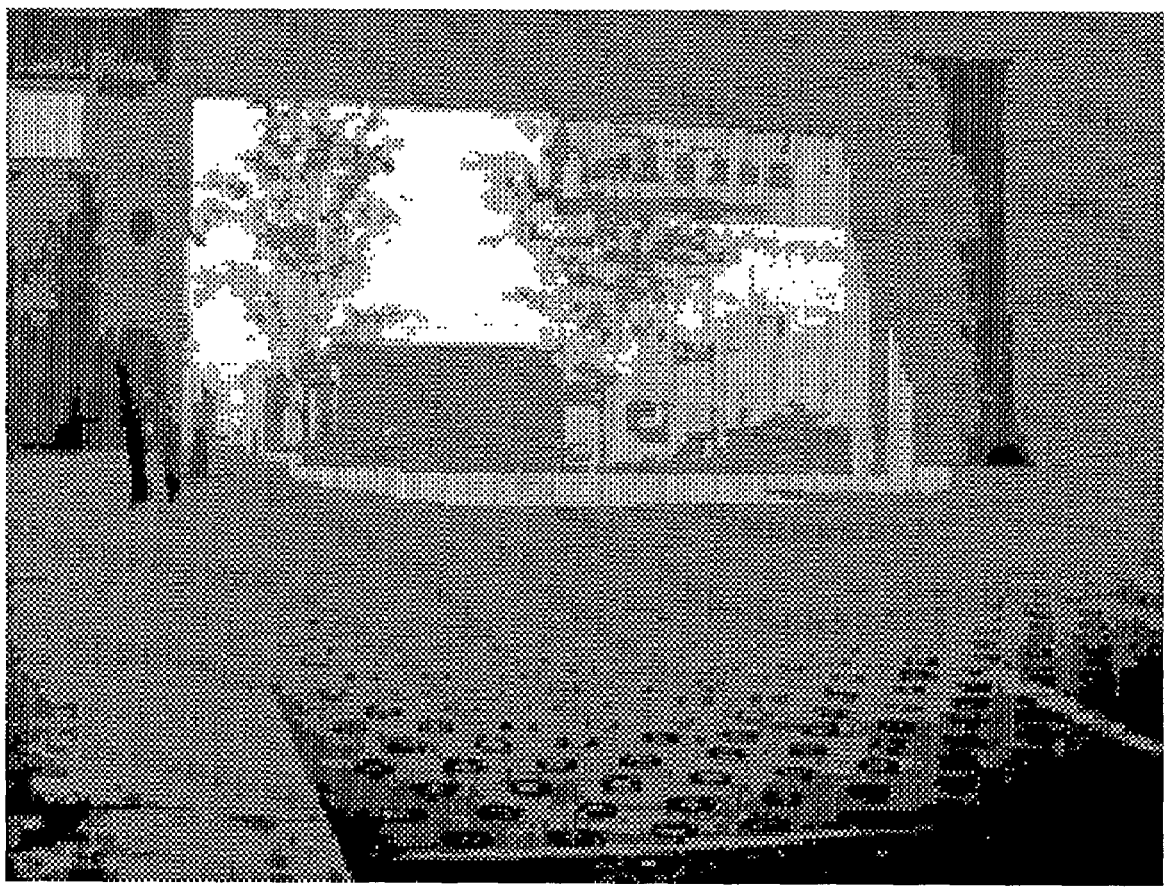
FIG. 6 is a diagram that illustrates a display example for the web browser 3.

Next, the CMOS imager 11 outputs the RGB data to the camera controller 21, with the frame rate set to, for example, 14 fps. The camera controller 21 converts the RGB data to YCrCb image data. The web server 22 compresses and converts this YCrCb image data to JPEG image data and sends it through the network L to the web browser 3 by means of HTTP communication. The web browser 3 then displays the JPEG image data as shown in FIG. 6. The result is that, even if the photographed subject is the same as in FIGS. 4 and 5, the image will be displayed with both light and dark areas optimized.

In addition, the input means of the computer PC is used to input, to the web browser 3 as control data, the frame rate, amplifier gain, color adjustment (color matrix adjustment), white balance adjustment, gamma correction, knee correction, black level adjustment, color saturation adjustment, and the like. The web browser 3 then sends this through the network L to the web server 22 by means of HTTP communication.

The web server 22 delivers the frame rate, amplifier gain, and the like to the sensor controller 12 through the camera controller 21. In addition, the web server 22 delivers, to the camera controller 21, the color adjustment, white balance adjustment, gamma correction, knee correction, black level adjustment, color saturation adjustment, and the like. The sensor controller 12 adjusts the frame rate, amplifier gain, and the like to control the CMOS imager 11.

Next, the CMOS imager 11 outputs the RGB data to the camera controller 21. The camera controller 21 performs video signals processes on the RGB data, such as color adjustment, white balance adjustment, gamma correction, knee correction, black level adjustment, and color saturation adjustment, and converts it to YCrCb image data. The web server 22 compresses and converts this YCrCb image data to JPEG image data and sends it through the network L to the web browser 3 by means of HTTP communication. The web browser 3 displays the JPEG image data.

Accordingly, the web server 22 is capable of changing the dynamic range of the CMOS imager 11 using the control data received from the network L. Therefore, the appropriate dynamic range characteristics can be set to match the input range for images with a wide range of input illuminations, so as to obtain images with optimal input ranges. In particular, it is possible to optimally perform monitoring based on images inside and outside of tunnels; monitoring based on images of nighttime car headlights, dark backgrounds and the like; monitoring inside and outside of railroad cars from their interiors; monitoring of station platforms; and the like. In addition, even in locations with poor lighting environments, it is possible to enlarge the range of dark areas so as to obtain clear images. Therefore, it is possible to provide a camera system suitable for remote monitoring.

In addition, it is possible to remotely control the frame rate, amplifier gain, color adjustment (color matrix adjustment), white balance adjustment, gamma correction, knee correction, black level adjustment, color saturation adjustment, and the like. Therefore, it is possible to obtain images of the monitored subject under optimal set conditions.

In addition, in cases where multiple cameras are installed in building a system for centrally managing image information through a computer PC, it is not necessary to separately enter, on site, camera settings for the locations where they are installed. This makes it possible to minimize setting costs, such as business travel expenses.

Furthermore, a computer PC can be used to periodic color adjustment maintenance work in response to degradation in individual parts, such as degradation of color reproducibility resulting from changes over time in the color filter installed in the CMOS imager 11. Likewise, even if the input-output characteristics change, the dynamic range can be changed, so maintenance can be performed remotely. In addition, because settings can be changed, it is possible to analyze camera failures, so maintenance can be done more quickly and problems are easier to solve.

It should be noted that the present invention is not limited to this; it may also be as follows. As a wide dynamic range camera, instead of a CMOS imager 11 it is permissible to use one that utilizes MOS sensor sub-threshold logarithmic characteristics; one in which two images—an image with a long integration time and an image with a short time—are combined using CCD (Charge-Coupled Device) sensors; or one in which the dynamic range characteristics can be varied continuously.

In addition, although a structure was presented wherein a web browser 3 is used to transmit control data to the web server 22, the web browser 3 is not a restriction as long as the HTTP communication is receivable by the web server 22.

In addition, the control data sent by the web browser 3 may be data for mode selection between automatic settings and manual settings for the sensor controller 12 or camera controller 21 (video signal processing means). For automatic settings in the sensor controller 12, for example, the number of pixels exceeding a specified value for light pixels is counted to control the logarithmic compression curve or gain; and the number of pixels exceeding a specified value for dark pixels is counted to change the integration time or control the gain. In addition, as automatic frame rate settings, if the image is dark, controls are performed to reduce the frame rate and raise the integration time; and if the image is light, controls are performed to conversely increase the frame rate and lower the integration time.

Furthermore, although a structure was presented wherein the web server 22 performs JPEG compression, MPEG compression, and the like, it is also permissible to use a structure wherein the camera controller 21 performs compression.

In addition, although a structure was presented wherein the camera head 1 and camera control unit 2 are separated, it is also permissible for them to be integrated.

Second Embodiment

Figure 7:
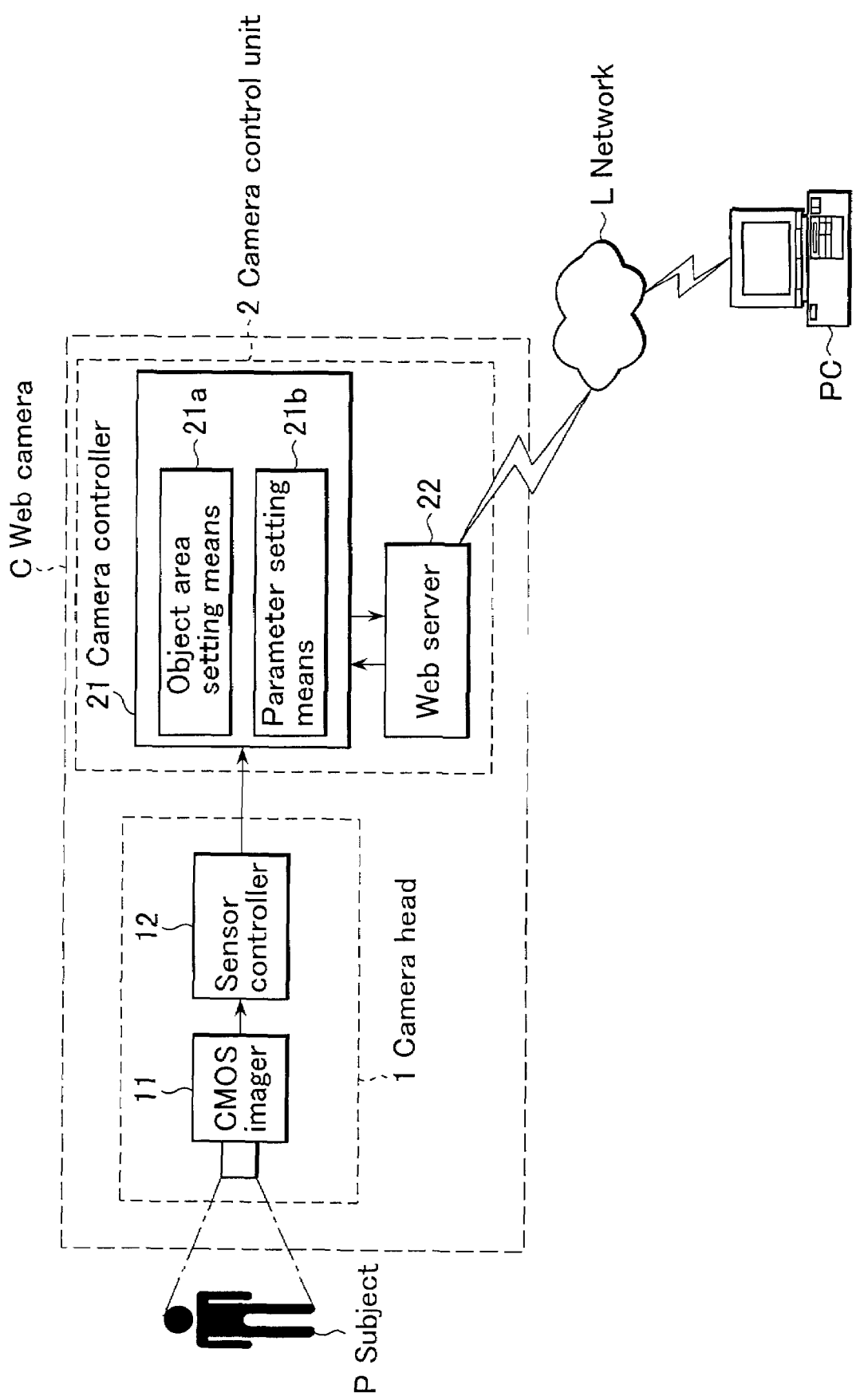
FIG. 7 is a block diagram that illustrates a second embodiment of the present invention.

FIG. 7 is a block diagram that illustrates the second embodiment of the present invention. Items which are the same as in FIG. 1 are denoted by the same numbers and are not described. It should be noted that the sensor controller 12 drives the CMOS imager 11, and also acquires the subject P image data taken by the CMOS imager 11 and sends it to the control unit 2.

In FIG. 7, the web camera C comprises the camera head 1 and camera control unit 2. The subject P is the subject being photographed by the CMOS imager 11. In addition, the camera controller 21 comprises object area setting means 21a and parameter setting means 21b.

The object area setting means 21a comprises a function for setting, as the object area, the image data area within the image data which is saturated by small light areas, such as spotlights.

The parameter setting means 21b counts the number of pixels exceeding the upper limit of brightness and the number of pixels not reaching the lower limit in the area set in the object area setting means 21a. It controls the compression curve and integration time of the CMOS imager 11 based on the numbers of counted pixels. In addition, it uses the compression curve and integration time of the CMOS imager 11 obtained through correction pertaining to this object area, i.e., brightness information, to again correct all of the image data.

With this parameter setting means 21b, the saturated areas in the object area are eliminated, and brightness is changed for all image data as well, so it is possible to obtain balanced, optimal image data.

Figure 8:
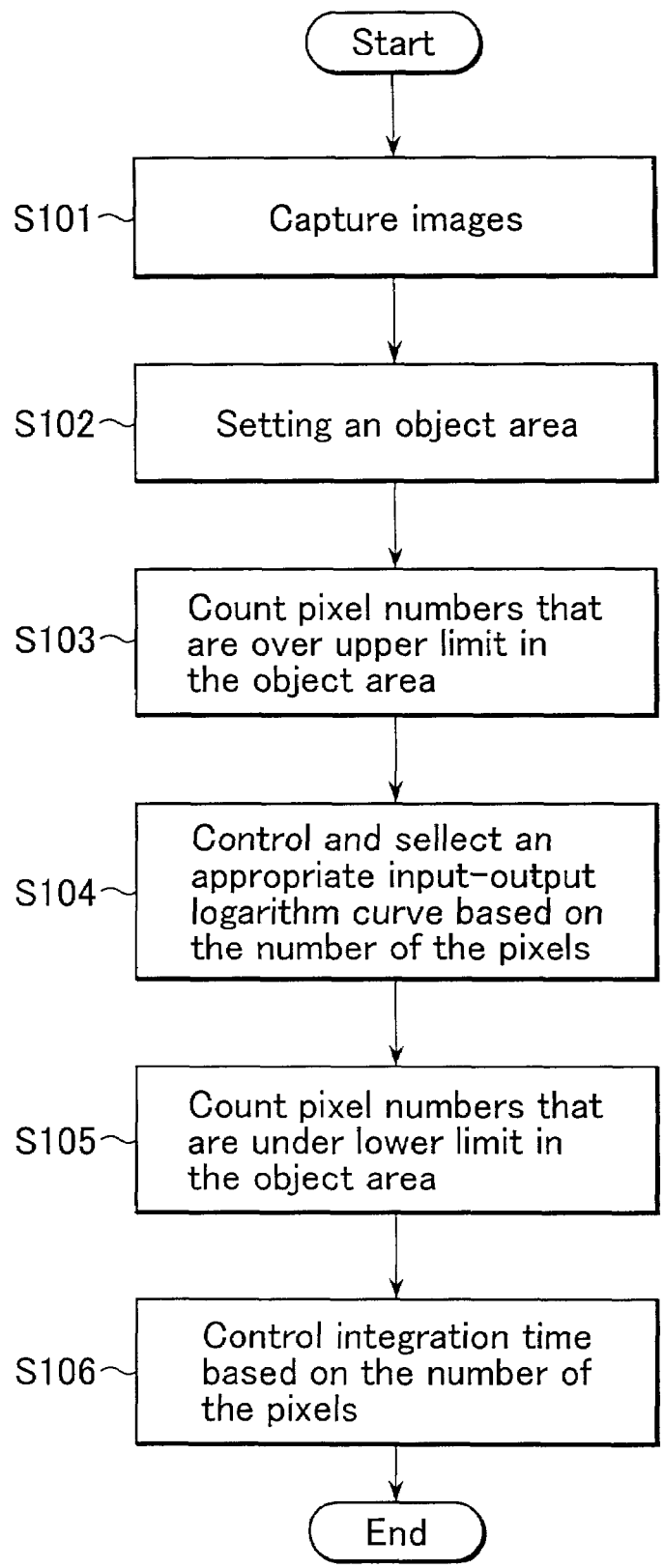
FIG. 8 is a flow chart that illustrates the operations of the system shown in FIG. 7.
Figure 9:
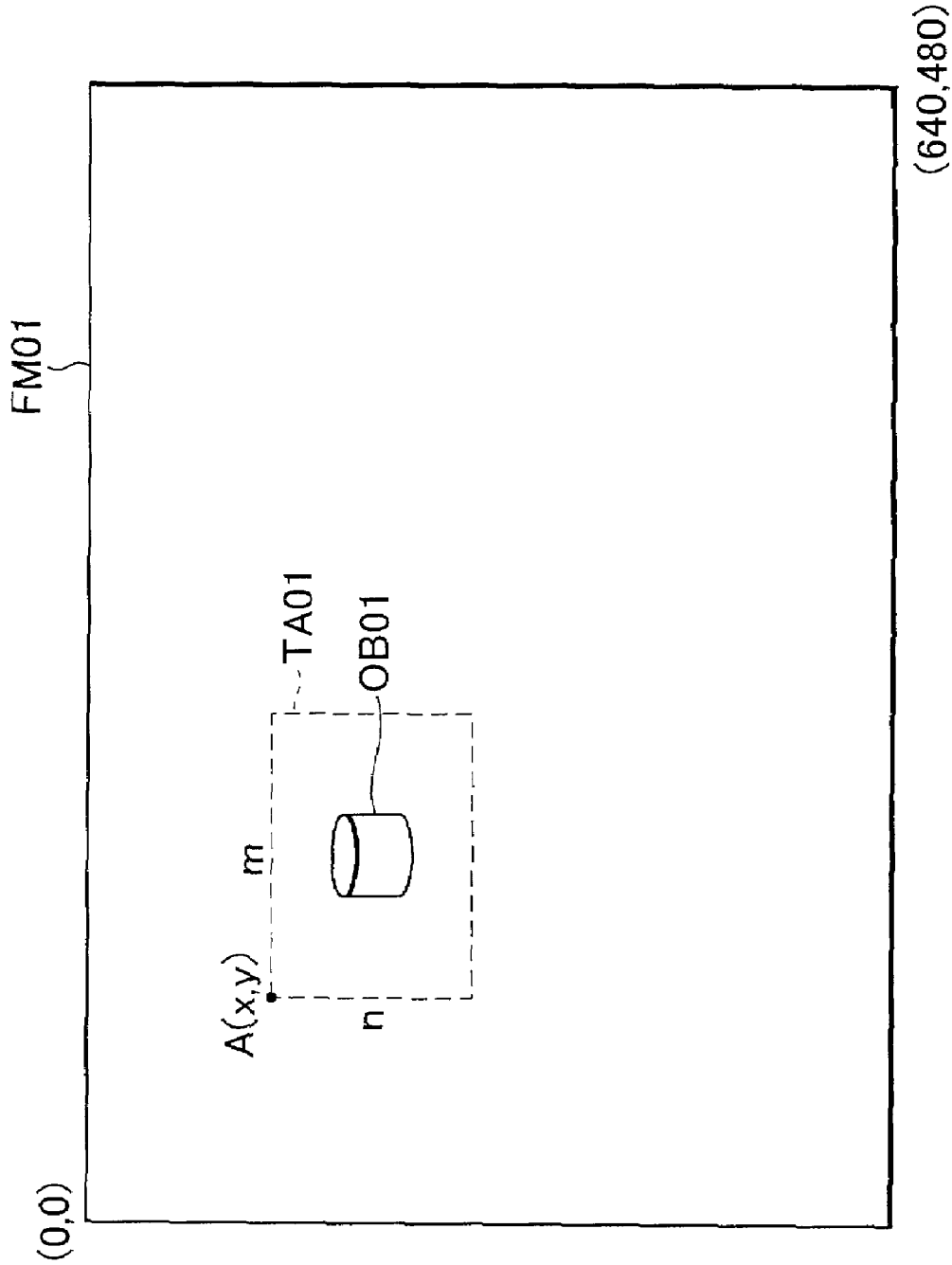
FIG. 9 is a diagram that explains the operations of the system shown in FIG. 7.

The operations of this system are described below. FIG. 8 is a flow chart that illustrates the operations of the system shown in FIG. 7. FIG. 9 is an explanatory diagram that illustrates an example of image data for a case in which the system shown in FIG. 7 is used and the light areas are extremely small relative to the image size.

In step S101, the CMOS imager 11 acquires image data FM01 in which the subject P has been photographed and outputs it to the camera control unit 2 through the sensor controller 12. Herein, it is assumed that a saturated area TA01, wherein the image is blurred by a spotlight OB01 or the like in the image data FM01, has been detected. The detection of this saturated area TA01 will be described in detail below. It may be done by automatic detection inside the camera controller 21; manual settings from the computer PC through the network L; or the like.

In step S102, this saturated area Ta01 is treated as the object area, and the starting address A (x, y) and area size m×n of this area TA01 are set in the object area setting means 21a. Herein, the size of the image data FM01 is, for example, 640×480.

In step S103, the parameter setting means 21b counts the number of pixels exceeding the upper limit of brightness in the image data within the saturated area TA01 in the object area setting means 21a; and in step S104, if the counted number of pixels is greater than the preset number of pixels, it performs change controls so that the dynamic range compression curve of the CMOS imager 11 becomes a compression curve from which saturation is eliminated.

More specifically, the parameter setting means 21b counts the number of pixels exceeding the upper limit of brightness in the image data in the object area TA01. If the counted number of pixels exceeding the upper limit of brightness is greater than the set value, then using this as brightness information, it controls the compression curve of the CMOS imager 11 in the direction that eliminates saturation through the sensor controller 12, thereby preventing saturation and the like in the light areas inside the object area TA01.

In addition, in step S105, the parameter setting means 21b counts the number of pixels not reaching the lower limit of brightness in the image data in the object area TA01; and in step S106, if the counted number of pixels is greater than the preset number of pixels, it performs change controls so that the integration time of the CMOS imager 11 becomes an integration time in which blotting of the image by dark areas is eliminated.

More specifically, the parameter setting means 21b counts the number of pixels not reaching the lower limit of brightness in the image data in the object area TA01. If the counted number of pixels not reaching the lower limit of brightness is greater than the set value, then using this as brightness information, it controls the integration time of the CMOS imager 11 in the direction that eliminates blotting through the sensor controller 12, thereby preventing blotting and the like in the dark areas inside the object area TA01.

Accordingly, the number of pixels exceeding the preset upper limit of brightness and the number of pixels not reaching the lower limit among all pixels of the image data in the object area TA01 are counted. If either of the counted numbers of pixels exceeds its setting, they are used as brightness information to control the compression curve and integration time of the CMOS imager 11. This makes it possible to prevent saturation and the like in the light areas and blotting and the like in the dark areas in the object area TA01, so that an optimal image can be obtained.

Furthermore, the parameter setting means 21b of the present invention applies, now to the entire area of image data FM01, the CMOS imager 11 dynamic range compression curve and CMOS imager 11 integration time determined by the brightness information in the object area TA01, which is obtained in step S104 and step S106 in the flow chart in FIG. 8.

As a result, the compression curve and integration time of the CMOS imager 11 are controlled in directions that eliminate saturation and blotting for all pixels in the image data FM01, thereby preventing saturation and the like in the light areas and blotting and the like in the dark areas present in the object area TA01, and making it possible to obtain an optimal image over the entire area of the photographed area FM01. Therefore, it is possible to appropriately view the light areas and dark areas on a given image, so remote monitoring can be performed appropriately.

It should be noted that in the above, during the integration time change controls, it is permissible to make the frame rate variable and broaden the integration time variable range.

In addition, with respect to the settings in the object area TA01, i.e., the address (x, y), the values x, y, m, and n for the object area size m×n, and the set number of pixels exceeding the upper limit of brightness and the set number of pixels not reaching the lower limit of brightness in the object area setting means 21a in FIG. 9, it is permissible to place setting means such as a setting switch in the camera control unit 2, and it is permissible to enter settings from the computer PC through the network L.

Figure 10:
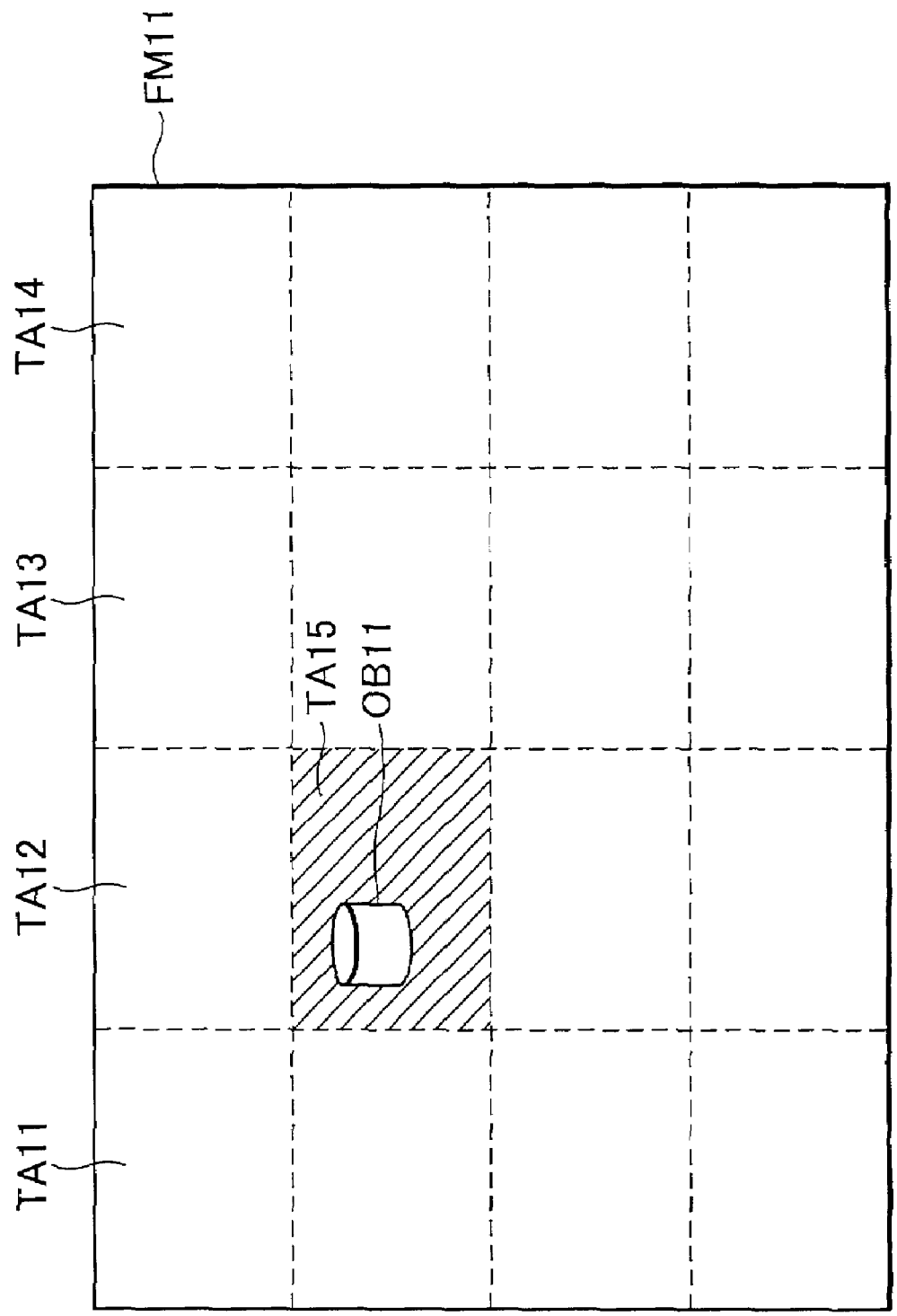
FIG. 10 is a diagram that explains the operations of the system shown in FIG. 7.

Furthermore, as shown in FIG. 10, it is permissible to first divide the entire image data FM11 into areas, such as areas TA11, TA12, TA13, TA14, and so on; and to click or specify the vicinity of a saturated area OB11 by means of the operator's mouse action or the like from the computer PC connected to the network L in cases where a saturated area TA15 occurs due to a spotlight OB11 or the like in the obtained image data FM11. Thereafter, the object area TA15, including the saturated area OB11, is set in the object area setting means 21a, and the operations of the flow chart shown in FIG. 8 for obtaining an optimal image are started.

Figure 11:
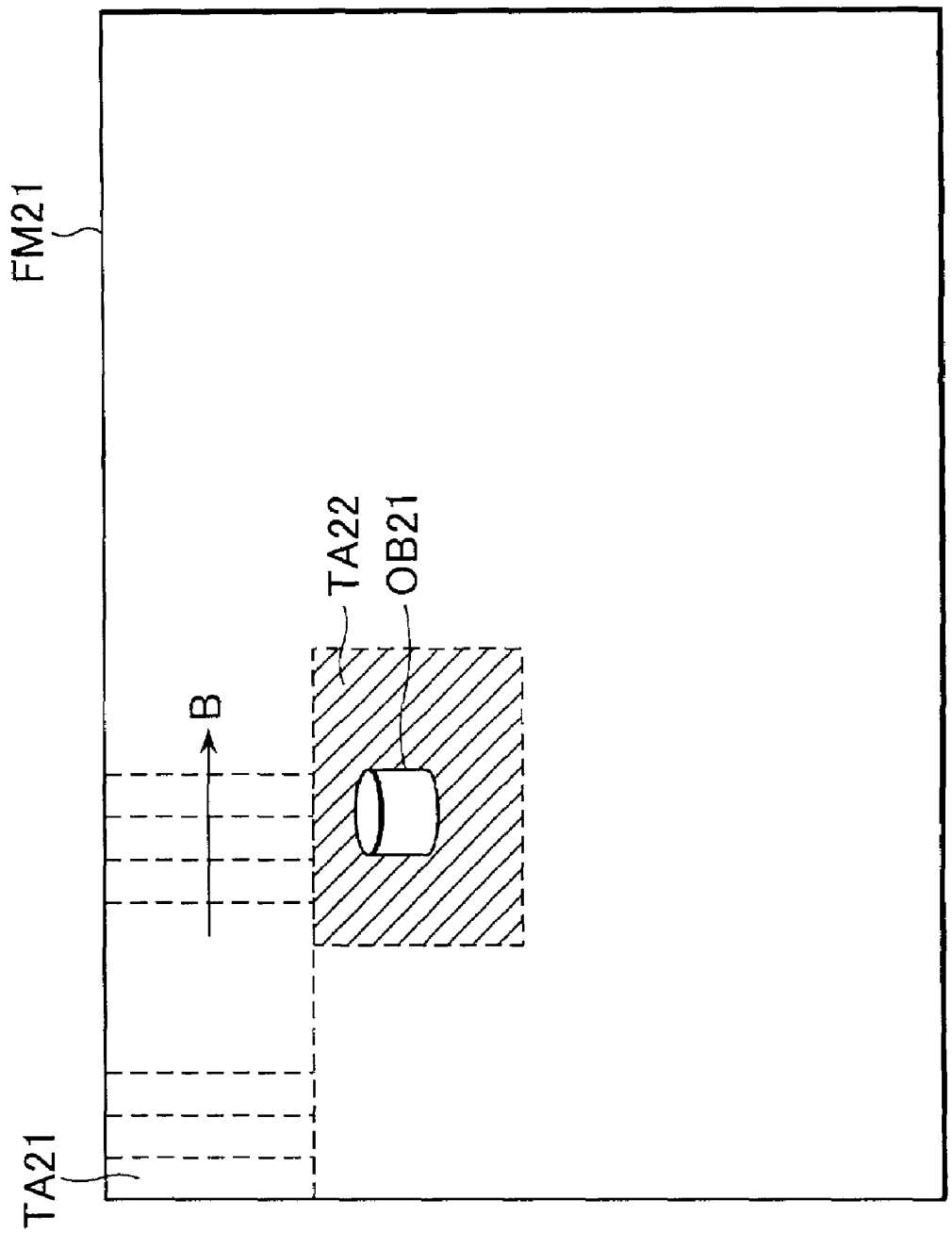
FIG. 11 is a diagram that explains the operations of the system shown in FIG. 7.

In addition, as shown in FIG. 11, it is permissible for the object area setting means 21a to define a minute area TA21 in the entire image data FM21 in the camera controller 21 and raster-scan this minute area TA21 in the direction of arrow B from the upper left part of the screen to the lower right part of the screen; and for the parameter setting means 21b to count the number of pixels exceeding the upper limit of brightness and the number of pixels not reaching the lower limit of brightness in this minute area TA21; so as to detect saturation and blotting. Thereafter, it is permissible to detect an area TA22 which is saturated by a spotlight OB21, then start the operations in the flow chart shown in FIG. 8 to obtain an optimal image.

Third Embodiment

Figure 12:
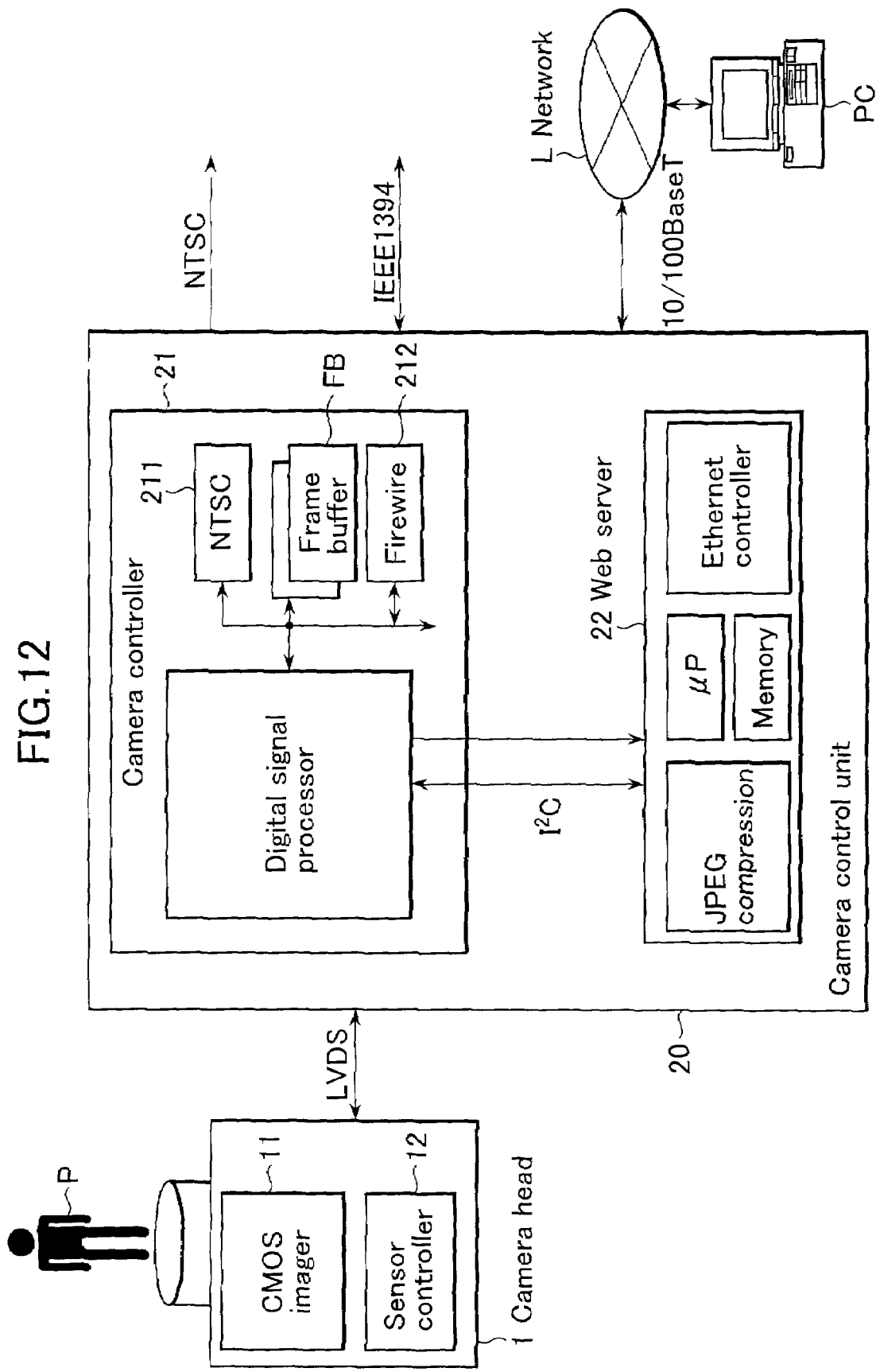
FIG. 12 is a block diagram that illustrates a third embodiment of the present invention.

FIG. 12 is a block diagram that illustrates a third embodiment of the present invention. Herein, items which are the same as in FIG. 1 are denoted by the same numbers and are not described.

In FIG. 12, the camera controller 21 comprises a digital signal processor DSP, frame buffer FB, NTSC encoder 211, and Firewire interface 212.

The digital signal processor DSP exchanges signals with the camera head 1 for optimization control of the input dynamic range, integration time, and the like, based on the brightness distribution of the image data sent from the camera head 1. In addition, the digital signal processor DSP performs color processes on the sent image data, such as color interpolation, color adjustment, gamma adjustment, and knee correction.

In addition, the digital signal processor DSP converts RGB data to 16-bit YCrCb data for interfacing with the NTSC encoder 211, Firewire interface 212, or web server 22, and generates horizontal synchronization signals, vertical synchronization signals, field synchronization signals, and pixel clock signals. In addition, a camera control signal, which is sent to the digital signal processor DSP from the computer PC through the network L, is interpreted as a camera control command by a microprocessor μP in the web server 22, and according to the command contents, is sent through an I²C serial bus to the camera controller 21, then written to its own [the DSP's] parameter setting register bank.

The operations of this system are described below. Herein, the computer PC outputs, as a camera control signal, an address signal (x, y) for an electronic pan/tilt function, and outputs an enlargement rate E for electronic zooming. Each of the constants is written to the parameter setting register bank inside the digital signal processor DSP, and the digital signal processor DSP executes the following processes.

First, it is assumed that the computer PC has output an electronic pan/tilt instruction as a camera control signal.

Herein, the pixel size of a normal video camera image is 640×480 pixels (VGA output), matching the display output. This is sufficient for the JPEG compression size in the web server 22, and the input size for NTSC analog output.

Figure 13:
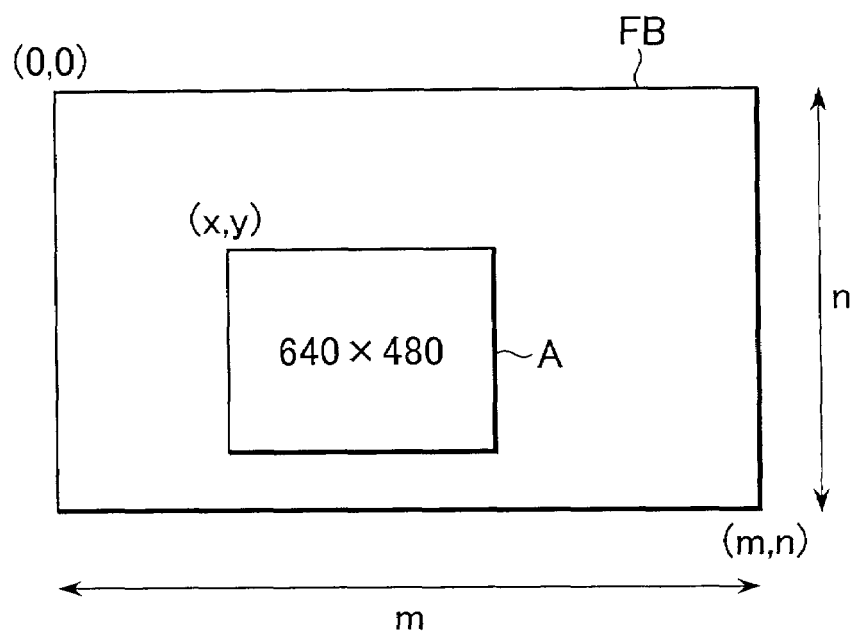
FIG. 13 is a diagram that illustrates a frame buffer in the system shown in FIG. 12.

With the present invention, in order to realize the pan/tilt function electronically and not mechanically, it is necessary to make the pixel size high-pixel, such that, for example, m×n (wherein m and n are integers)=1280×960 pixels, as shown in FIG. 13.

In addition, the frame buffer FB in the camera controller 21 has capacity sufficient to handle this pixel size. It cuts out and processes the image to be output according to the address signal (x, y) sent from the computer PC.

More specifically, if the two values of the address signal (x, y) are defined and provided to the frame buffer FB as an image output position, then it is possible to identify the image output position. In this case, the following are assumed: $0 \leq x \leq m-640$, $0 \leq y \leq n-480$, and m>640, n>480. Accordingly, it is possible to obtain image data for area A on the frame buffer FB, and the image applied to this area A is sent to the computer PC through the network L.

In addition, in the case of a structure wherein the camera controller 21 does not comprise a frame buffer FB, it is permissible to specify a pixel cutout position in the CMOS imager 11 as an image sensor in the camera head 1, so as to take out the original data applied to area A shown in FIG. 13. In this case, a register that holds the address signal (x, y) is placed in the sensor controller 12, and the system is structured so that the address signal (x, y), equivalent to 640×480 pixels, is output from the sensor controller 12 side as an image cutout start position.

When an area A specified as desired by an address signal (x, y) on the frame buffer FB is cut out as described above, the operator can obtain effects similar to mechanical pan/tilt actions.

Next, it is assumed that electronic zooming, which expresses enlargement and reduction, is specified through the computer PC as a camera control signal.

Figure 14:
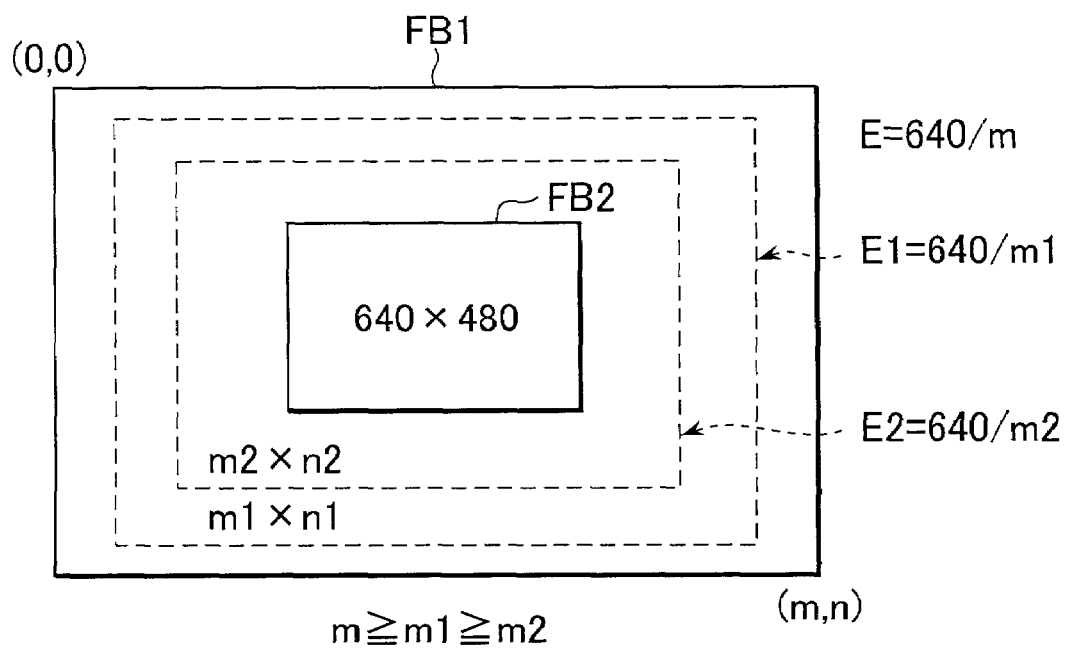
FIG. 14 is a diagram that illustrates the zooming operation in the system shown in FIG. 12.

As shown in FIG. 14, it is possible to realize, for example, electronic zooming which is continuously variable in a range from m×n pixels to 640×480 pixels. Herein, $m \leq 640$ and $n \leq 480$.

More specifically, an m×n frame buffer FB1 and an output 640×480 frame buffer FB2 are secured as areas. At a reduction ratio of 1, there are 640×480 pixels and no particular processes are performed. At the maximum reduction ratio, the image area is compressed from m×n pixels to 640×480 pixels. The image data is secured and the results are output to the output 640×480 frame buffer FB2.

In this case, the reduction ratio is generally 640/m (=480/n).

In addition, in FIG. 14, when the image area is compressed from m1×n1 pixels to 640×480, the reduction ratio is E1=640/m1=480/n1; and when the image area is compressed from m2×n2 pixels to 640×480 pixels, the reduction ratio is E2=340/m2=480/n2. It should be noted that herein, the following is assumed: $m \geq m1 \geq m2$.

Accordingly, the reduction ratio provided from the computer PC is Ez (z=1, 2, 3, . . . ). When mz and nz are determined by calculating back from this, the required mz×nz pixel size can be determined. In addition, the image can be compressed from these mz×nz pixels to the output 640×480 pixels, so as to obtain image data with a reduction ratio of Ez. This makes it possible to send the desired reduced image through the network L to the computer PC.

Accordingly, it is possible to realize pan/tilt and zoom functions electronically and not mechanically on the camera side, from the computer PC through a network L such as the Internet. Therefore, it is possible to reduce the rate of camera system failures, making it possible to reduce maintenance and the like, so a camera system suitable for remote monitoring can be provided.

In addition, in the example in FIG. 12, a case was presented wherein a single computer PC is connected to the network L. However, this is not limited to a single unit. It is also possible to connect multiple monitoring computers, and cameras can be electronically controlled using the above-mentioned sort of functions of the present invention through these multiple monitoring computers.

Fourth Embodiment

FIG. 15 is a block diagram that illustrates a fourth embodiment. Herein, items which are the same as in FIGS. 1 and 7 are denoted by the same numbers and are not described.

In FIG. 15, the memory 23 is, for example, a hard disk, memory, or the like, and is placed in the camera control unit 2. It records multiple image processing applets (image processing programs), which image-process the camera image data. The multiple image processing applets are Java applets that run on the web browser 3. They perform different types of image processes, such as binary conversion, edge processing, white balancing, color processing, brightness adjustment, contrast adjustment, moving object detection, face recognition checking, sharpening, and smoothening; and extract features of the camera image data. (It should be noted that Java is a trademark or registered trademark of Sun Microsystems, Inc. in the United States and other countries.) The web server 24 is provided instead of the web server 22. It comprises an image compression means; and through the network L sends the image processing applets of the memory 23 to a computer PC (external device), and sends camera image data to the computer PC.

The operations of this type of system are described below. The input means of the computer PC specifies, to the web browser 3, the URL (Uniform Resource Locator) corresponding to the desired image process. Next the web browser 3 sends it by means of HTTP communication through the network L to the web server 24.

Based on the URL from the web browser 3, the web server 24 reads, from the memory 23, the image processing applet corresponding to the desired image process, and sends it by means of HTTP communication through the network L to the web browser 3. The web browser 3 executes the image processing applet and requests the web camera C for an image through the network L.

Next, the camera head 1 transfers the photographed RGB data to the camera controller 21. The camera controller 21 performs video signal processing on the RGB data, approximating it to the same condition as that seen by people, then converts it to YCrCb image data. The web server 24 uses the image compression means to compress and convert this YCrCb image data to JPEG image data, then sends it by means of HTTP communication through the network L to the web browser 3. The web browser 3 image-processes the JPEG image data by means of the image processing applet, then displays it on the display. Next, the input means of the computer PC provides an image processing modification instruction to the image processing applet on the web browser 3. Accordingly, the image processing applet on the web browser 3 image-processes the JPEG image data and the web browser 3 displays it on the display.

In tunnel monitoring, for example, if lighting equipment fails, the brightness changes, making it impossible to properly monitor traffic conditions. In addition, in the case of a fire inside a tunnel or a traffic accident, there could be numerous possible users, such as governmental organizations, media organizations, fire departments, police departments, and the families of victims. In the case of such disasters, the tunnel interior is different from normal conditions due to smoke and the like. Therefore, it is impossible to check the conditions without image-processing the camera image. In addition, there are more users and a greater number of accesses to the web camera C. At the same time, governmental organizations, fire departments and police departments must image-process the camera image and use it as a disaster countermeasure.

In such cases, the web server 24 transmits the image processing applets of the memory 23 through the network L to the web browser 3, and the web browser 3 handles image processing. Therefore, even if the web camera C is made available to numerous persons, the load on the web camera C can be reduced, and camera image data can be sent to the network L continuously and with stability. Thus, remote monitoring can be done reliably.

In addition, image processing is done on the web browser 3 side, so different image processes can be done for each user. Accordingly, it is possible to process camera images according to the objectives of the user. More specifically, it is possible to conduct monitoring according to requests even if the remote monitoring objectives are different.

In addition, the web server 24 sends the image processing applets of the memory 23 through the network L to the web browser 3, so there is no need to install image processing software. More specifically, image processing can be used and applied to camera images for remote monitoring by anyone at any location, regardless of the user's knowledge level.

Furthermore, it is easy to add types of image processing and to improve and modify image processing by adding and modifying the image processing applets of the memory 23. Accordingly, image processing can be done immediately without any need to install image processing software in each computer PC, even in cases where it is desirable to perform new image processes or improve image processes at multiple locations in an emergency.

It should be noted that the present invention is not restricted to this. Although a structure was presented wherein the memory 23 and web server 24 are placed in a web camera C, it is permissible to have a structure wherein a separate Web server which connects to the network L is disposed, and image processing applets are distributed from the memory inside the Web server.

In addition, it is permissible to make a structure wherein an FTP server means is placed in the web camera C, and image processing applets of the memory 23 are modified or added through the FTP server means.

In addition, although a structure was presented wherein the web camera C transmits real-time images, it is permissible to have a structure wherein memory is placed in the web camera C or computer PC; camera image data is saved to this memory; and this camera image data is displayed by the web browser 3 on a display unit.

Furthermore, although the computer PC was an external device, it may of course be a mobile terminal or the like.

What is claimed is:

1. A camera system, comprising:
a camera to monitor a location, the camera including an image sensor to capture real-time image data at the monitored location;
a plurality of external devices having web browsers and located at respective locations remote from the camera, the camera transmitting said real-time captured image data through a network to said plurality of external devices;
a memory that stores a plurality of image processing applets that respectively perform different feature extraction types of image processing on said captured real-time image data, wherein said plurality of image processing applets run on the web browsers of said plurality of external devices; and
a web server that transmits said real-time captured image data from said camera through said network to said plurality of external devices, and transmits respective image processing applets that respectively perform different feature extraction types of image processing from said memory through said network to respective external devices,
wherein performing of the image processing on the captured real-time image data by the respective image processing applets transmitted to the respective external devices is not dependent on a control condition of the camera, and
wherein said respective image processing applets that respectively perform different feature extraction types of image processing extract features from said captured real-time image data in said web browser.

2. The camera system of claim 1, wherein said web server comprises image compression means that image-compresses image data, which is based on said image sensor, in order to obtain said captured image data.

3. The camera system of claim 1, wherein said plurality of image processing applets perform at least one of the processes among binary conversion, edge processing, white balancing, color processing, brightness adjustment, contrast adjustment, moving object detection, face recognition and matching, sharpening, and smoothening.

4. The camera system of claim 1, wherein said image sensor is a CMOS sensor, CCD sensor, or MOS sensor.

5. The camera system of claim 1, wherein said network is the Internet, an ISDN network, ADSL network, PHS network, CATV network, or wireless network.

* * * * *